United States Patent [19]

Kandler et al.

[11] Patent Number: 4,482,460

[45] Date of Patent: Nov. 13, 1984

[54] PROCESS FOR REMOVING CARBON BLACK FROM AQUEOUS SUSPENSIONS

[75] Inventors: Joachim Kandler, Erftstadt; Manfred Wolter, Hürth-Knapsack, both of Fed. Rep. of Germany

[73] Assignee: Hoechst Aktiengesellschaft, Fed. Rep. of Germany

[21] Appl. No.: 213,868

[22] Filed: Dec. 8, 1980

[30] Foreign Application Priority Data

Dec. 7, 1979 [DE] Fed. Rep. of Germany ....... 2949286

[51] Int. Cl.$^3$ .............................................. C01B 31/02
[52] U.S. Cl. ................... 210/706; 210/711; 210/712; 210/771; 423/461
[58] Field of Search ............... 210/702, 703, 704, 705, 210/706, 769, 771, 776, 790, 804, 806, 710, 711, 712; 23/314; 423/445, 461

[56] References Cited

U.S. PATENT DOCUMENTS 2,987,386 6/1961 Chapman et al. ................ 48/196 R
3,039,851 6/1962 Kosewicz et al. .................. 423/461
3,615,297 10/1971 Dille et al. ...................... 423/461 X

*Primary Examiner*—Richard V. Fisher
*Assistant Examiner*—W. Gary Jones
*Attorney, Agent, or Firm*—Connolly & Hutz

[57] ABSTRACT

The invention relates to a process for removing carbon black from an aqueous suspension obtained by washing a gas containing carbon black with water. To this end, a gas stream comprising hydrocarbons and at least one inert gas is introduced into a suspension having a solids content of from 0.5 to 4% by weight, at a temperature of from 10° to 80° C. In so doing, the carbon black agglomerates and collects on the surface of the suspension water from which it is separated, for example by skimming it off. The gas stream is produced by passing inert gas over the separated carbon black containing the hydrocarbons and heated to 200° to 400° C., the carbon black being converted into a dry, free-flowing material.

8 Claims, No Drawings

PROCESS FOR REMOVING CARBON BLACK FROM AQUEOUS SUSPENSIONS

The present invention relates to a process for removing carbon black from an aqueous suspension obtained by washing a gas containing carbon black with water, which process comprises treating the suspension with hydrocarbons and separating and drying the carbon black.

In the production of synthesis gas by thermal conversion of hydrocarbons that are liquid at room temperature, in the presence of oxygen or oxygen-containing gases and, if desired, water vapour, at temperatures above 1000° C. and under pressures of from 1 to 80 bar, a reaction gas that contains carbon black is obtained from which the carbon black is removed by washing with water, thereby producing an aqueous suspension containing from 5 to 40 g of carbon black/liter (cf. DE-AS No. 2 515 633 dated Sept. 27, 1979).

The aqueous carbon black suspension can be worked up by adding water-immiscible solvents to produce agglomerates in the form of small balls or granules which can be removed by sieving. To utilize the energy content of these agglomerates, they can be burned as fuel in underfired furnaces, if desired together with fuel oil (cf. DD-PS No. 54 001 dated Feb. 20, 1967).

Since the carbon blacks occurring in the aqueous suspensions have a large specific surface area and, owing to their intensive structural characteristics, a pronounced absorption power, it is desirable to obtain these carbon blacks in bulk form. For this reason, it has been proposed in DE-OS No. 2 654 235 dated June 1, 1978 to whirl the aqueous carbon black suspension with fuel oil in order to pelletize the carbon black, and to remove the fuel oil from the separated pellets by extraction with light benzine, whilst according to DE-AS No. 2 546 072 dated Apr. 21, 1977, the carbon black in the carbon black/water suspension is treated with $C_3$–$C_8$ hydrocarbons and then separated, the temperature and pressure conditions applied in the separation of the carbon black from the water being such that the hydrocarbons used in the vapor phase.

Finally, according to DE-AS No. 2 515 633, a free-flowing carbon black suitable for use in depolarizing compositions of dry batteries is obtained from an aqueous carbon black suspension by thoroughly mixing the carbon black suspension with vaporizable hydrocarbons, in the liquid phase, at temperatures of from 5° to 120° C. and pressures of from 1 to 20 bar and, after separating the carbon black from the liquid, removing the hydrocarbons and water by heating, and subsequently increasing the temperature to 1100° to 2200° C.

The disadvantage with the process described in DE-AS No. 2 515 633 is that, in heating the carbon black to free it from hydrocarbons and water after it has been separated from the liquid, a certain amount of the carbon black is always entrained by the vapor which results in blockage of the pipelines and apparatus of the plant after only a few hours of operation. Furthermore, owing to its high absorption power, the carbon black entrained by the vapor is capable of reabsorbing the condensed hydrocarbons and the condensed water, so that, in extreme cases, not only is a paste formed that is very dificult to handle, but also there is no longer any liquid phase. This paste can be eliminated only by burning, as a result of which the valuable carbon black contained therein is lost.

It is therefore the object of the present invention to provide a process for removing carbon black from an aqueous suspension by treating it with hydrocarbons and by separating and drying the carbon black, in which process it is possible to dispense with condensation of the vapor phase produced during drying of the carbon black and hence also with the isolation of the hydrocarbons in liquid form. To this end, the invention provides more particularly for a gas stream comprising hydrocarbons and at least one inert gas to be introduced into a suspension having a solids content of from 0.5 to 4% by weight, at a temperature of from 10° to 80° C., the gas stream being produced by passing inert gas over separated carbon black heated to temperatures of from 200° to 400° C.

Further preferred features of the present invention provide:

(a) for the gas stream for separating the carbon black from the water as bulk material to contain from 5 to 30% by volume of hydrocarbons;
(b) for the gas stream for separating the carbon black from the water as a foamy paste to contain from 0.1 to 5% by volume of hydrocarbons;
(c) for the gas stream to be introduced while stirring;
(d) for aliphatic or cycloaliphatic hydrocarbons having from 4 to 8 carbon atoms to be used;
(e) for nitrogen to be used as inert gas.

In the process of the invention it is of particular advantage that no isolated hydrocarbon phase occurs although the temperature of the aqueous carbon black suspension is below the boiling temperature of the hydrocarbon present in the gas stream. The separated carbon black is therefore free-flowing and always pourable. If the process of the invention is carried out discontinuously, the carbon black separates in the form of a pulverulent, non-tacky phase on the surface of the water after introducing the gas stream into the suspension for 1 to 5 minutes.

If the process of the invention is carried out continuously, the aqueous carbon black suspension is fed to a stirring vessel through the base thereof at a rate such that the hydrocarbons introduced with the gas stream are absorbed directly by the carbon black. Instead of a stirring vessel, a washing column or another device for washing gas can be used to bring the aqueous carbon black suspension into contact with the gas stream containing hydrocarbons, but, in that case, pulverulent solid material is liable to be formed on the surface of the water.

The step of drying separated carbon black in accordance with this invention not only permits the total amount of hydrocarbons present therein to be used again for the treatment of further aqueous carbon black suspensions; it also permits the carbon black entrained in the production of the gas stream to be recovered.

Use can be made in the process of the invention of a gas stream containing less than 1% by volume of hydrocarbons, such as obtained, for example, as flushing gas of storage tanks filled with liquid hydrocarbons. Upon the introduction of such gas into the aqueous carbon black suspension, the carbon black collects in the form of a foam on the surface of the water. As soon as the introduction of the gas stream is interrupted, the carbon black and the water separate from each other completely, it being possible, in contrast to the untreated aqueous suspension of carbon black, to separate off the foamy paste lying on the surface of the water by filtration without any difficulty. Obviously, even the small amount of hydrocarbons in the gas stream is enough to render the carbon black sufficiently hydrophobic for bubbles of transport gas to adhere to the carbon black particles and for the foam to build up on the surface of the water. In this manner it is possible to utilize even small amounts of hydrocarbons which are inevitably obtained.

The carbon black obtained in the form of a foamy paste can be converted into a pulverulent non-tacky material by adding a liquid hydrocarbon, with agitation, after the introduction of the gas.

The following examples illustrate the invention:

EXAMPLE 1

(Comparative Example)

60 g of benzine (boiling range: 60° to 90° C.) were added at 25° C., while stirring, to 3 of an aqueous suspension of carbon black having a carbon black content of 8 g/l. After stirring for 3 minutes, the carbon black collected on the surface of the water in the form of a pulverulent free-flowing material, whilst the aqueous phase beneath it was completely clear and hence free of carbon black. After filtering off the pulverulent material it was heated to 300° C. and the vapor phase liberated during this operation was condensed. 20 g of dry, free-flowing carbon black was obtained together with 121 g of condensate which contained 4 g of carbon black.

EXAMPLE 2

(According to the invention)

A stream of nitrogen, which had previously been passed over benzine (boiling range 60° to 90° C.) boiling under reflux and which contained 10 to 12% by volume of benzine vapor, was introduced at 25° C., while stirring, into 3 l of an aqueous suspension of carbon black having a carbon black content of 8 g/l. After the introduction of 150 of nitrogen containing benzine vapor, the carbon black had completely separated as a pulverulent phase on the surface of the water, whilst the aqueous phase beneath it was completely clear and hence free of carbon black.

Having filtered off the pulverulent phase (140 g) it was heated in a glass tube at 290° C. for 60 minutes while passing nitrogen over it (100 l/h). The gas stream leaving the glass tube was introduced at 25°, while stirring, into 3 l of an aqueous suspension of carbon black having a carbon black content of 8 g/l. 19 g of dry, free-flowing carbon black was removed from the tube; the carbon black had separated from the suspension of carbon black as a pulverulent phase on the surface of the water.

The dry carbon black had a BET surface area (cf. Brunauer, Emmet and Teller; J. Amer. Chem. Soc. 60 (1938) 309) of 110 m$^2$/g, an iodine adsorption (cf. ASTM D 1510-65) of 105 g/g of carbon black, an ash content of 2.5% and a content of benzene-soluble material of 0.2% and a content of acetone-soluble material of 0.1%.

EXAMPLE 3

(According to the invention)

A stream of nitrogen charged with 10 to 12% by volume of benzine vapor as described in Example 2, was introduced at 25° C. from below via a frit into a vertical column filled with 1.5 l of an aqueous suspension of carbon black having a carbon black content of 8 g/l. In so doing, the carbon black suspension was thoroughly mixed solely by the action of the ascending gas stream. After introducing 140 l of the gas mixture, all the carbon black was located on the surface of the water in the form of a pulverulent material.

After filtering off the pulverulent material, the carbon black was dried as described in Example 2.

EXAMPLE 4

(According to the invention)

A stream of nitrogen which had previously been passed through benzine (boiling range 60° to 90° C.) at room temperature and contained about 0.8% by volume of benzine vapor, was introduced from below, at 25° C. into a vertical column containing 1.5 l of an aqueous suspension of carbon black having a carbon black content of 8 g/l. After introducing only 30 l of the gas mixture, the carbon black began to collect in the form of a foam on the surface of the water. After introducing a further 90 l of the gas mixture and interrupting the introduction of the gas stream, the carbon black collected as a foamy paste on the surface of the water, whilst the aqueous phase was completely clear and free of carbon black. The foamy paste could be filtered without any difficulty.

The filtration residue was dried as described in Example 2.

EXAMPLE 5

(According to the invention)

The procedure described in Example 2 was repeated with the modification that the stream of nitrogen containing benzine vapor was introduced, while stirring, into the suspension of carbon black heated to 45° to 50° C. In this case also, the carbon black separated in the form of a pulverulent, free-flowing phase on the surface of the water, whilst the aqueous phase was completely clear. 89 g of carbon black were filtered off as a pulverulent phase and were dried as described in Example 2.

EXAMPLE 6

(According to the invention)

The procedure described in Example 2 was repeated with the modification that, before being introduced into the aqueous suspension of carbon black, the stream of nitrogen was passed over n-pentane (boiling point 36° C.) boiling under reflux. In this case also, the carbon black separated in the form of a pulverulent, free-flowing phase on the surface of the water, whilst the aqueous phase was completely clear. 130 g of carbon black were filtered off as a pulverulent phase and were dried as described in Example 2.

EXAMPLE 7

(According to the invention)

The procedure described in Example 2 was repeated with the modification that an aqueous suspension of carbon black having a carbon black content of 18 g/l was used. Because of the resulting higher viscosity of the suspension, considerably more vigorous stirring had to be carried out during the introduction of the stream of nitrogen containing benzine vapor. After introducing 350 l of the nitrogen containing benzine vapor, the carbon black had completely separated as a pulverulent phase on the surface of the water, whilst the aqueous phase was completely clear. 318 g of carbon black were filtered off as a pulverulent phase and were dried as described in Example 2.

We claim:

1. In a process for removing carbon black from an aqueous suspension obtained by washing a gas containing carbon black with water, said suspension containing 0.5 to 4% by weight solid matter, introducing into said suspension while stirring a gas stream comprising hydrocarbons and at least one inert gas at temperatures of 10° to 80° C. with the resultant formation of a hydrocarbon-containing carbon black agglomerate on the surface of the water, and separating the carbon black agglomerate from the water, the improvement according to which the gas stream is prepared by passing gas consisting essentially of one or more inert gases over the carbon black agglomerate which has been separated from the water, and heated to temperatures of 200° to 400° C.

2. The process according to claim 1, wherein aliphatic or cycloaliphatic hydrocarbons having from 4 to 8 carbon atoms are used.

3. The process according to claim 1, wherein nitrogen is used as inert gas.

4. The process as claimed in claim 1, wherein the gas stream for separating the carbon black agglomerate from water with the resultant formation of carbon black bulk material contains 5 to 30% by volume of hydrocarbons.

5. The process as claimed in claim 1, wherein the gas stream for separating the carbon black agglomerate from water with the resultant formation of carbon black forming a foamy paste contains from 0.1 to 5% by volume of hydrocarbon.

6. A method for preparing a gas stream for use in a separation process for separating carbon black from an aqueous suspension containing 0.5–4% by weight solid matter, the aqueous suspension having been obtained by washing a gas containing carbon black with water, said method comprising the steps of:

(a) treating said aqueous suspension with a hydrocarbon-containing gas stream to form carbon black agglomerate on the surface of the water, thereby obtaining a hydrocarbon-containing carbon black agglomerate, (b) removing said hydrocarbon-containing carbon black agglomerate from the surface of the water, (c) heating the thus-removed hydrocarbon-containing carbon black agglomerate to a temperature of 200° to 400° C. while passing gas consisting essentially of one or more inert gases over it, thereby obtaining a hydrocarbon-containing exit gas stream, (d) recovering said gas stream for use to form carbon black agglomerates, according to step (a), and (e) recovering the carbon black which has been heated according to step (c) as a free-flowing dry pulverulent material.

7. A method according to claim 6, wherein the hydrocarbon-containing gas stream used in said step (a) contains 5–30% by volume of hydrocarbons.

8. A method according to claim 6, wherein hydrocarbon-containing gas stream used in said step (a) contains 0.1 to 5% by volume of hydrocarbons; said step (a) resulting in the formation of a foamy paste containing the carbon black agglomerate which is treated according to said step (c), and wherein the foamy paste is converted to a pulverulent non-tacky material by adding a liquid hydrocarbon, with agitation, after treating with the hydrocarbon-containing gas stream.

* * * * *